United States Patent [19]

Kazacos et al.

[11] 4,256,544

[45] Mar. 17, 1981

[54] METHOD OF MAKING METAL-CHALCOGENIDE PHOTOSENSITIVE DEVICES

[75] Inventors: Maria S. Kazacos, Earlwood, Australia; Barry Miller, New Providence, N.J.

[73] Assignee: Bell Telephone Laboratories, Incorporated, Murray Hill, N.J.

[21] Appl. No.: 137,317

[22] Filed: Apr. 4, 1980

[51] Int. Cl.$^3$ .................. H01M 4/04; H01M 6/36
[52] U.S. Cl. .................. 204/2.1; 204/86; 136/260; 429/111
[58] Field of Search ............ 204/2.1, 86; 136/89 CD; 429/111

[56] References Cited

U.S. PATENT DOCUMENTS 4,127,449  11/1978  Heller et al. .................. 204/2.1

FOREIGN PATENT DOCUMENTS 2844712  4/1979  Fed. Rep. of Germany ..... 136/89 CD
1532616  11/1978  United Kingdom ............... 136/89 CD

OTHER PUBLICATIONS

G. Hodes et al., "Photoelectrochemical Energy Conversion & Storage Using Polycrystalline Chalcogenide Electrodes", *Nature*, vol. 261, pp. 403-404 (1976).

G. M. Fotanov et al., "Analysis of the Conditions for the Precipitation of Metal Selenides from Aqueous Solutions with Sodium Selenosulphate", *Russian J. Inorg. Chem.*, vol. 14, pp. 322-324 (1969).

N. C. Sharma et al., "Electroless Deposition of Semiconductor Films", *Thin Solid Films*, vol, 60, pp. 55-59 (1979).

H. Gerischer, "Electrochemical Photo & Solar Cells—Principles & Some Experiments", *Electroanalytical Interfacial Electrochem.*, vol. 58, pp. 263-274 (1975).

R. C. Kainthla et al., "Solution Growth of CdSe & PbSe Films", *J. Electrochem. Soc.* vol. 127, pp. 277-283 (1980).

*Primary Examiner*—Aaron Weisstuch
*Attorney, Agent, or Firm*—Richard D. Laumann

[57] ABSTRACT

We have found that a photoactive metal selenide film, such as CdSe, may be formed by cathodic eletrodeposition from a seleno-sulfite ($SeSO_3^{2-}$) solution without the need for a subsequent heat treating step which, it is hypothesized, was required by the simultaneous deposition of elemental selenium.

10 Claims, No Drawings

METHOD OF MAKING METAL-CHALCOGENIDE PHOTOSENSITIVE DEVICES

TECHNICAL FIELD

This invention relates generally to devices with metal-chalcogenide films having photosensitive properties and particularly to a method for electrodepositing such films.

BACKGROUND OF THE INVENTION

Photosensitive materials, i.e., materials having characteristics that change when struck by electromagnetic radiation, have been of scientific and technological interest for many years. This interest has increased in recent years because of the realization that fossil fuels are being depleted and the prospect that photovoltaic solar energy conversion devices might be extensively used. Interest has been further stimulated in recent years because of the need for sensitive photodetectors, that is, optical radiation detectors, in optical communications systems. Many devices and materials have been considered as candidates and numerous approaches have been taken in fabricating such devices and materials.

One class of materials that is of particular interest for photosensitive devices, including photovoltaic devices, is formed by the chalcogenide, i.e., Group VIA, semiconductors, i.e., semiconducting compounds of sulfur, selenium and tellurium. This class of materials includes cadmium telluride, cadmium sulfide, cadmium selenide, lead selenide, etc. These compounds have been used in heterojunction solar cells, optical detectors, and more recently, semiconductor liquid junction solar cells. The latter cells are described in a review paper written by Heinz Gerischer and published in *Electroanalytical Chemistry and Interfacial Electrochemistry*, 58 pp. 263-274, (1975). Cadimum selenide is a leading candidate for use in such cells because its bandgap is not far from the theoretically most efficient bandgap for photovoltaic devices using sunlight.

Several methods have been used in the fabrication of cadmium selenide films for such cells. For example, the films have been electrodeposited both cathodically and anodically as well as electrolessly. The former method uses a selenious acid-cadmium ion solution and the latter method uses a cadmium anode in selenide medium. The methods are discussed in *Nature*, 261, pp. 403 (1976) and U.S. Pat. No. 4,127,449 issued on Nov. 28, 1978 to Adam Heller and Barry Miller, respectively. The electrodeposition methods are attractive candidates for use in photoelectrochemical cells, such as semiconductor liquid junction solar cells, because of the possibility of producing low cost and large area films.

Anodically deposited n-type cadmium selenide, CdSe, films are attractive candidates for use as photosensitive films because they have fairly good, as formed, photoresponses. However, the films are formed by anodizing cadmium in a selenium containing electrolyte and their growth is therefore restricted in thickness by the necessity of cadmium ion transport through the film. Cathodically deposited cadmium selenide films are not so limited in thickness because only electron transport to the solution interface is required. However, thermal treatment after electrodeposition or formation is required to develop adequate photoresponse.

The cathodic method reduces solutions of selenium oxide and selenious acid in the presence of relatively high concentrations of cadmium sulfate to yield a film of cadmium selenide at the cathode surface. A study of the reduction of selenious acid and cadmium selenide formation has shown that the initial cathodic reaction involves the formation of $H_2Se$. The desired deposition of cadmium selenide then proceeds through the reaction of this compound with $Cd^{+2}$ ions to deposit cadmium selenide. However, the $H_2Se$ formed may also undergo a reaction with the selenious acid to form elemental selenium. The rate of the latter reaction depends upon the concentration of the selenious acid but is sufficiently rapid at high acid concentrations so that elemental selenium is deposited with CdSe in significant amounts in cathodically produced films. Elemental selenium deposition can be minimized by plating at low selenious acid concentrations but the excess selenium in the film cannot be completely eliminated. The excess selenium is undesirable because the film initially has mixed n- and p-type behavior in its photocurrent spectra and the thermal treatment step previously mentioned betters the photocurrent spectra of the film by improving the initially poor crystallinity and vaporizing excess selenium.

Some of the above problems could be avoided by an electroless deposition method such as that disclosed in the *Russian Journal of Inorganic Chemistry* 14 (3) pp. 322-324 (1969) and discussed more fully in *Thin Solid Films* 60 pp. 55-59 (1979). Briefly, the method uses the decomposition of sodium selenosulfite in an alkaline solution of the corresponding cation. However, the reaction rate must be kept slow to avoid excessive precipitation. Further, while the initial growth rate may be as high as 200 Angstroms/minute, it decreases and ultimately falls to zero and thus provides a maximum achievable film thickness.

Thus, a process for the cathodic electrodeposition of metal-selenide films, such as CdSe, which does not require a thermal treatment step after deposition and which retains the desirable characteristics of CdSe films would be advantageous.

SUMMARY OF THE INVENTION

We have found that in a method for making devices with metal-selenide films having photosensitive properties, the film can be cathodically deposited on a substrate by using the reduction of seleno-sulfite, $SeSO_3^{-2}$, in the presence of the metal species. Cathodic deposition of the metal selenide, such as CdSe, occurs when an externally generated electrical current flows through the solution. The seleno-sulfite is prepared in situ by the dissolution of elemental selenium in sulfite and selenide is then generated by a reaction with two electrons to form $Se^{-2}$. A cadmium containing species, such as $CdSO_4$, is in the solution. A complexing agent is desirably added to the solution. This complexing agent shifts the potential for Cd(II) reduction to values sufficiently negative to avoid interference with seleno-sulfite reduction and minimizes the deposition of elemental cadmium which might otherwise result because the reduction potential of $Cd^{+2}$ is positive with respect to the potential of $SeSO_3^{-2}$ reduction. Higher valent selenium species capable of oxidizing selenide are eliminated by this method.

DETAILED DESCRIPTION

The method of this invention may be used with any device having a photosensitive metal-selenide film. Exemplary devices include the semiconductor liquid junction solar cell mentioned previously. The method of this invention will be illustrated by a description of the formation of a CdSe film and a semiconductor liquid junction cell using such a film, a counterelectrode and an electrolyte contacting both the film and counterelectrode.

An aqueous solution of seleno-sulfite, i.e., $SeSO_3^{-2}$, having a concentration of at least 5 millimolar (mM) is conveniently prepared by forming an aqueous solution of at least $0.1M$ $Na_2SO_3$ and the calculated stoichiometric amount of powdered selenium in an $NH_3/NH_4^+$ buffer. Seleno-sulfite concentrations below 5mM are not preferred because selenide generation is too slow. The maximum obtainable concentration of $SeSO_3^{-2}$ depends, in well known matter, on the sulfite concentration and the pH. The $Na_2SO_3$ concentration is desirably between 0.1 M and 2.0 M, although any concentration greater than 0.1 M may be used provided that an amount sufficient to dissolve all selenium is present. An ammonium buffer, i.e., $NH_4^+/NH_3$, is present with a concentration desirably between 0.1 M and 2 M. The ammonium complexing buffer keeps the metal ion in solution. The relatively high concentration of $Na_2SO_3$ and the ammonium buffer are necessary to obtain a high concentration of $SeSO_3^{-2}$ because the equilibrium constant of the reaction $Se + SO_3^{-2} \rightleftharpoons SeSO_3^{-2}$ is approximately unity, and consequently a pH of at least 7 assists dissolution from the reaction $Se + HSO_3^{-} \rightarrow SeSO_3^{-2} + H^+$. Other buffers, such as $HCO_3^{-}/CO_3^{=}$, may be used. Cadmium ions are conveniently added to the solution in the form of $CdSO_4$ although other common cadmium compounds, such as $CdCl_2$ or $Cd(NO_3)_2$, may be used. The Cd concentration is desirably at least 0.1 M because lower concentrations lead to low deposition rates. An additional complexing agent that is stronger than the ammonium buffer is also added to the solution so that the reduction of seleno-sulfite to selenium occurs before reduction of the metal ion. For cadmium, ethylenediaminetetraacetic acid, commonly called EDTA, is a suitable complexing agent. The cadmium ions complexed with EDTA or other complexing agent should be soluble in the complexing buffer. The EDTA is present in a molar amount equal to or greater than that of the cadmium salt used. The solution is agitated by any conventional technique until all the selenium has dissolved.

The n-type CdSe films are formed by electrodepositing from the solution on to substrates such as titanium, gold or cadmium. These films may be used as the photosensitive electrode in a semiconductor liquid junction cell. The substrates are desirably degreased with acetone and in the case of titanium, etched with hydrofluoric acid, typically 5 percent, prior to deposition. The films are conveniently fabricated with a constant current sufficient to form the film with good characteristics. Currents between 0.5 and 2.0 $mA/cm^2$ have been found to yield good films. Deposition times between 1 and 4 hours yield films having thicknesses between 1.5 and 12 microns. The solution may be stirred, e.g., magnetically, during deposition if desired.

An electrode of CdSe fabricated as described above on a titanium substrate and having a thickness of 6 microns and an area of approximately 1 $cm^2$ formed the photoactive electrode in a semiconductor liquid junction solar cell such as that described in U.S. Pat. No. 4,084,044 issued on Apr. 11, 1978 to Adam Heller, Barry Miller and Murray Robbins. The cell had an electrolyte which was selenide/polyselenide redox couple, as described, and a carbon counterelectrode. Other redox couples such as telluride/polytelluride or sulfide/polysulfide might be used. The short circuit photocurrent and the open circuit photopotentials under white light were 0.39 volts and 3.1 $mA/cm^2$, respectively. After heat treating at 600 degrees C. for 10 minutes in an argon atmosphere, no improvement in cell characteristics was noticed.

It is hypothesized that the heat treating step is not required because selenium co-deposition with the CdSe film does not occur for the following reasons. Excess $SO_3^{-2}$ dissolves any $Se^0$ present and there is no higher valence state than $Se^0$ for reaction with $Se^=$. The reduction potential of $Cd^{+2}$ is positive with respect to the potential of $SeSO_3^{-2}$ reduction and some deposition of Cd metal results. This problem is alleviated by the addition of a complexing agent for $Cd^{+2}$, such as EDTA, which is stronger than $NH_3$ and shifts the potential for Cd(II) reduction to more negative values and does not interfere with the selenosulfite reduction.

Although the method of this invention has been illustrated by reference to the deposition of CdSe films, it will be readily understood by those working in the art that the method can be used for other metal selenides, e.g., ZnSe, PbSe, etc. A complexing agent, such as EDTA, will be used to prevent direct metal plating before selenide ion generation, i.e., the complexing agent shifts the potential for the metal ion reduction to a value at least close to the potential for seleno-sulfite reduction. Further, the film may be intentionally doped to alter photoconductive or photovoltaic properties or to produce n-type or p-type characteristics. Still further, after one layer has been deposited, the film may be removed from the solution and placed in a second solution for the deposition of a second film. In this manner, p-n junctions or heterojunctions may be produced.

We claim:

1. A method of making a device having a photosensitive metal selenide film comprising the steps of:
   forming a selenium and metal containing aqueous solution; and
   cathodically depositing the metal selenide on a conductive substrate in said solution
characterized in that
   said selenium containing solution comprises an aqueous solution of $SeSO_3^{-2}$.

2. A method as recited in claim 1 in which said solution further comprises a complexing agent.

3. A method as recited in claim 2 in which said agent is ethylenediaminetetraacetic acid.

4. A method as recited in claim 3 in which said forming step comprises the steps of dissolving selenium and $Na_2SO_3$ in an aqueous buffer.

5. A method as recited in claim 4 in which said buffer comprises $NH_3/NH_4^+$.

6. A method as recited in claim 5 in which said solution has a pH of at least 7.

7. A method as recited in claim 3 in which said metal is cadmium.

8. A method as recited in claim 1 in which said $SeSO_3^{-2}$ has a concentration of at least 5 mM.

9. A method as recited in claim 1 or 7 comprising the further steps of assembling said substrate coated with said metal selenide film, a counterelectrode and an electrolyte in an electrolytic cell.

10. A method as recited in claim 9 in which said electrolyte comprises a redox couple selected from the group consisting of selenide, sulfide and telluride anions.

* * * * *